US011749998B2

(12) United States Patent
Shorten et al.

(10) Patent No.: US 11,749,998 B2
(45) Date of Patent: Sep. 5, 2023

(54) APPARATUS FOR DIRECTING POWER FLOW BETWEEN MULTIPLE DEVICES

(71) Applicant: University College Dublin, National University of Ireland, Dublin, Dublin (IE)

(72) Inventors: Robert Shorten, Dublin (IE); Julia O'Connell, Dublin (IE); Barry Cardiff, County Dublin (IE); Giovanni Russo, Dublin (IE); Pietro Ferraro, Dublin (IE); Paul Dermot Cuffe, Dublin (IE)

(73) Assignee: UNIVERSITY COLLEGE DUBLIN, NATIONAL UNIVERSITY OF IRELAND, Dublin (IE)

( * ) Notice: Subject to any disclaimer, the term of this patent is extended or adjusted under 35 U.S.C. 154(b) by 428 days.

(21) Appl. No.: 16/767,811

(22) PCT Filed: Nov. 29, 2018

(86) PCT No.: PCT/EP2018/083062
§ 371 (c)(1),
(2) Date: May 28, 2020

(87) PCT Pub. No.: WO2019/106114
PCT Pub. Date: Jun. 6, 2019

(65) Prior Publication Data
US 2020/0376969 A1    Dec. 3, 2020

(30) Foreign Application Priority Data

Nov. 29, 2017    (GB) ..................................... 1719884

(51) Int. Cl.
*H02J 7/00*    (2006.01)
*B60L 53/14*    (2019.01)
(Continued)

(52) U.S. Cl.
CPC ............ *H02J 7/0013* (2013.01); *B60L 53/10* (2019.02); *B60L 53/12* (2019.02); *B60L 53/14* (2019.02);
(Continued)

(58) Field of Classification Search
CPC ..... H02J 7/0013; H02J 7/00032; B60L 53/10; B60L 53/12; B60L 53/14; B60L 53/16;
(Continued)

(56) References Cited

U.S. PATENT DOCUMENTS

| 2011/0140656 | A1* | 6/2011 | Starr ....................... B60L 53/65 320/109 |
| 2011/0144823 | A1* | 6/2011 | Muller ...................... H02J 7/02 700/297 |

(Continued)

FOREIGN PATENT DOCUMENTS

| JP | 2015231289 A | * | 12/2015 |
| KR | 20190005011 A | * | 1/2019 |

OTHER PUBLICATIONS

International Search Report and Written Opinion for PCT/EP2018/083062 dated Mar. 26, 2019.

*Primary Examiner* — Drew A Dunn
*Assistant Examiner* — Manuel Hernandez
(74) *Attorney, Agent, or Firm* — MEAGHER EMANUEL LAKS GOLDBERG & LIAO, LLP

(57) ABSTRACT

Provided are an apparatus and system for directing power flow between multiple devices, the apparatus comprising: one or more inlet ports for connection to one or more devices; a plurality of outlet ports configured for supplying electrical power; and a computing device configured to route power from the one or more inlet ports to the outlet ports. The system comprises a plurality of the apparatus connected to each other.

51 Claims, 15 Drawing Sheets

(51) Int. Cl.
  *B60L 53/12* (2019.01)
  *B60L 55/00* (2019.01)
  *B60L 53/66* (2019.01)
  *B60L 53/60* (2019.01)
  *B60L 53/67* (2019.01)
  *B60L 53/10* (2019.01)
  *B60L 53/16* (2019.01)
  *H01R 13/639* (2006.01)
  *H02J 3/14* (2006.01)

(52) U.S. Cl.
  CPC ............... *B60L 53/16* (2019.02); *B60L 53/60* (2019.02); *B60L 53/665* (2019.02); *B60L 53/67* (2019.02); *B60L 55/00* (2019.02); *H01R 13/6397* (2013.01); *H02J 7/00032* (2020.01); *H02J 3/14* (2013.01)

(58) Field of Classification Search
  CPC ........ B60L 53/60; B60L 53/665; B60L 53/67; B60L 55/00; H01R 13/6397
  USPC .................................................. 320/108, 109
  See application file for complete search history.

(56) References Cited

U.S. PATENT DOCUMENTS

| | | | |
|---|---|---|---|
| 2014/0062401 | A1 | 3/2014 | Gadh et al. |
| 2016/0193932 | A1* | 7/2016 | Vaghefinazari ....... H02J 7/0027 320/109 |
| 2016/0368391 | A1* | 12/2016 | Kojima .................... B60L 53/65 |
| 2017/0197517 | A1* | 7/2017 | Jamieson ................ B60L 53/62 |
| 2019/0378365 | A1* | 12/2019 | Jordan, III .............. B60L 53/60 |
| 2020/0094702 | A1* | 3/2020 | Ohtomo ............. H01R 13/6675 |
| 2021/0394627 | A1* | 12/2021 | Lee ......................... B60L 53/22 |

* cited by examiner

US 11,749,998 B2

APPARATUS FOR DIRECTING POWER FLOW BETWEEN MULTIPLE DEVICES

FIELD OF THE INVENTION

The present disclosure relates to charging and directing power flow between electrical devices. More particularly, it relates to an apparatus for directing power flow between multiple devices, such as charge points and electrical powered devices.

BACKGROUND OF THE DISCLOSURE

In recent years there has been a gradual but progressively increasing movement towards a widespread use of electric vehicles in order to reduce the negative impacts of internal combustion engine vehicles on the environment and population's health caused by air and noise pollution.

Many of the limitations of electric vehicles (battery related issues, range anxiety, charging times, lack of infrastructure) are being resolved by the OEMs and infrastructure providers.

One issue that remains is that of Charge Point anxiety. This is the "angst" that prevails when one needs access to a charge point. This issue is directly related to cars blocking charge points in our cities. Several solutions exist for sharing charge points, such as car swapping algorithms where users arrange to exchange parking spaces via an app. These solutions do not guarantee access to a parking space and require dedicated brokerage engines.

In view of the above-described technologies, there is therefore a need for a system which addresses at least the problems outlined above.

SUMMARY OF THE INVENTION

These and other problems are addressed by providing an apparatus as detailed in claim 1 and a system as detailed in claim 29. Advantageous features are provided in dependent claims.

The apparatus and system of the present disclosure alleviate, or even completely eliminate, charge point anxiety as well as provide other benefits, as outlined below.

These and other features will be better understood with reference to the following figures which are provided to assist in an understanding of the present teaching, by way of example only.

DETAILED DESCRIPTION

Embodiments of the present disclosure will now be described with reference to some exemplary apparatus and systems described herein. It will be understood that the embodiments described are provided to assist in an understanding of the present disclosure and are not to be construed as limiting in any fashion. Furthermore, modules or elements that are described with reference to any one figure may be interchanged with those of other figures or other equivalent elements without departing from the spirit of the present disclosure.

The present disclosure provides an apparatus and system that are configured to alleviate, or even completely eliminate, charge point anxiety. Moreover it will be understood that the terms 'charge point' and 'charging point' are equivalent. Also, the term 'box' illustrated in some of the drawings will be understood to refer to the apparatus for directing power flow between multiple devices according to the present disclosure. Unless otherwise specified, the term "devices" encompasses electrically-powered devices such as electric vehicles, e-bikes, e-scooters, mobile devices, Internet of Things (IOT) devices, and charging points. As such, the apparatus may be configured to redirect power flow between one or more charging points and a plurality of electrically powered devices. The apparatus may also be configured to redirect power flow between a plurality of electrically powered devices themselves.

Figure 1:
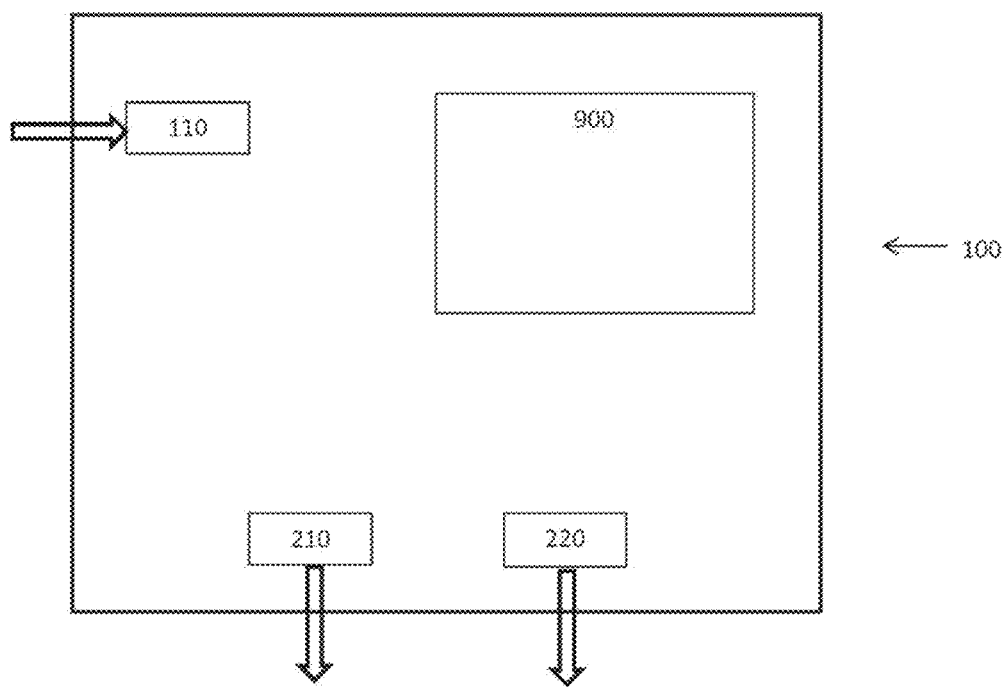
FIG. 1 is a block diagram illustrating an apparatus for extending one or more charge points, according to an embodiment of the present disclosure.

FIG. 1 is a block diagram illustrating an apparatus 100 for extending one or more charge points to multiple electrically powered devices, according to an embodiment of the present disclosure. Referring to FIG. 1, the apparatus 100 comprises one or more inlet port(s) 110 for connection to one or more charge points, at least two outlet ports 210 and 220 configured for supplying electrical power; and a computing device 900 configured to route power from the one or more inlet port(s) to the at least two outlet ports.

The apparatus 100 may be configured to direct power flow from at least one charging point to one or more electrically powered devices. The apparatus 100 may be configured to redirect power flow from one or more electrically powered devices to one or more charging points. The apparatus 100 may be configured to redirect power flow between a plurality of electrically powered devices. In view of the above, the apparatus 100 may be considered an adaptor for redirecting power flow between electrically powered devices and/or charging points.

Figure 2:
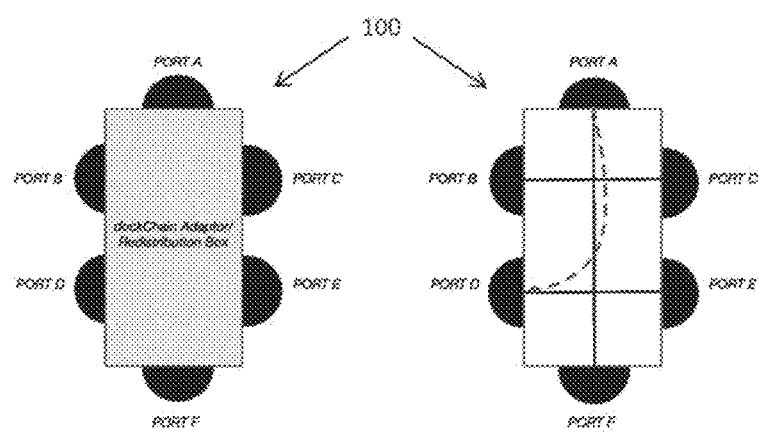
FIG. 2 is a diagram illustrating an apparatus for extending one or more charge points, comprising 6 ports which can be outlet or inlet ports, according to an embodiment of the present disclosure.

FIG. 2 depicts an exemplary embodiment in which the apparatus 100 comprises six ports which may be inlet ports and/or outlet ports for extending one or more charge points.

Figure 3:
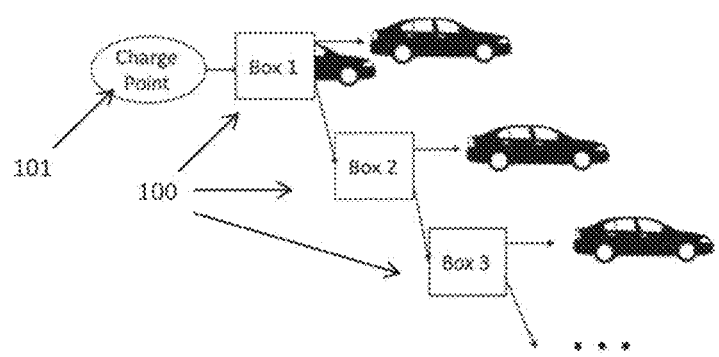
FIG. 3 is a diagram illustrating a system for extending one charge points to multiple electrically powered devices, the system comprising a plurality of apparatus connected in a daisy chain configuration, according to an embodiment of the present disclosure.

In an exemplary embodiment of the present disclosure involving electric vehicles, such vehicles carry the apparatus 100 much like how a spare wheel is carried. The apparatus 100 comprises one or more inlet port(s) for connection to one or more charge points. Public charge points may be located on-street and in locations such as shopping centres and car parks. Such charge points are connected to a 3-phase electricity supply and depending on the car type and battery size, charging can take between 1 and 6 hours. The apparatus 100 also includes at least two outlet ports configured for supplying electrical power; and a computing device configured to route power from the one or more inlet port(s) to the at least two outlet ports. The apparatus 100 may comprise a cable and plug connector for plugging into one or more charge points, and at least two outlet ports for enabling connection or charging to additional electrically powered devices. In this way electric vehicles can be daisy chained together and never block a charge point 101, as depicted in FIG. 3. FIG. 3 is a diagram illustrating a system for extending one or more charge points to multiple electrically powered devices, the system comprising a plurality of apparatus 100 (or boxes as indicated in the drawings) connected in a daisy chain configuration, according to an embodiment of the present disclosure.

End-users of the apparatus 100 may include the following:

| User | Embodiment |
|---|---|
| Owners of public charge points (Hotels, hospitals, universities, etc.) Owners of private charge points | Apparatus 100 may be used to extend the reach of a charge point to multiple vehicles. |
| Plug-in vehicle owners | Apparatus 100 may be used to prevent a plug-in car from blocking a charge point. |

Figure 4:
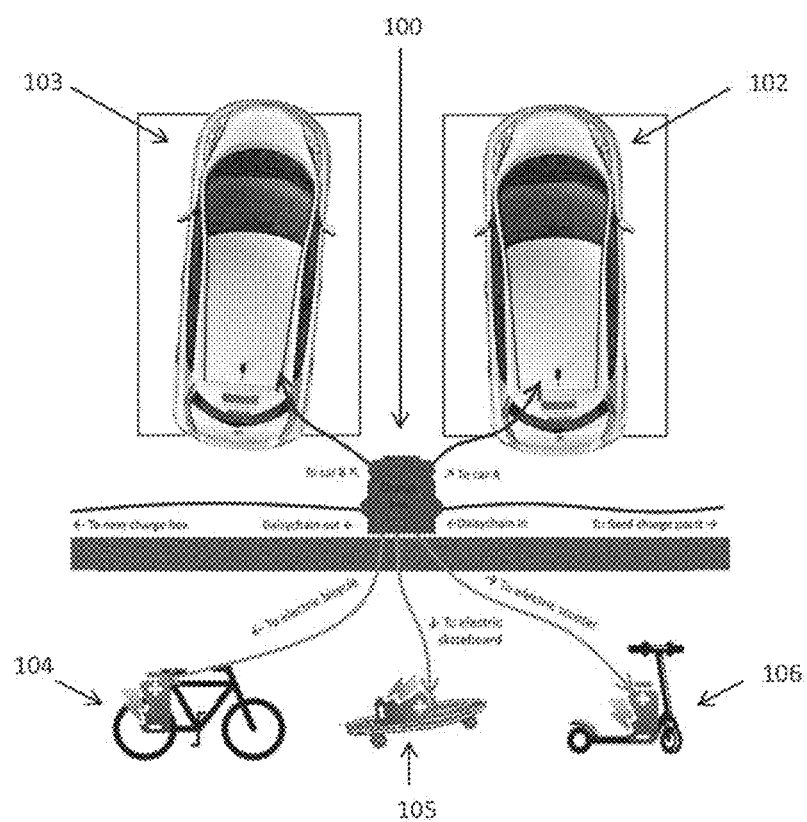
FIG. 4 is a diagram illustrating different types of electrical vehicles connected to an apparatus according to an embodiment of the present disclosure.

The apparatus 100 may also be used for other devices that require simultaneous charging (e.g., mobile devices, e-bikes, e-scooters, and most Internet of Things (IOT) devices). In this regard, the apparatus 100 may be configured for an electric vehicle charging point, a computing device charging point or an Internet of Things (IOT) charging point. FIG. 4 is a diagram illustrating an embodiment of the apparatus 100 according to the present disclosure, in which a plurality of different electrically powered devices 102-106 are connected to an apparatus 100. In one embodiment, each apparatus 100 can be dynamically paired with one or more electrical devices using a Distributed Ledger Technology (DLT) token-based system. The apparatus 100 may be configured to implement the distributed ledger network with user payment devices. The DLT token-based system may be private and pseudo-anonymous.

The apparatus 100 may comprise a housing for receiving the componentry of the apparatus 100, various hardware and software components that function to perform processes according to the present disclosure, such as supporting software, logic, and payment mechanisms to secure the apparatus 100, and one or more processors configured to route power from the one or more inlet ports to the outlet ports according to a charging protocol. The one or more processors may route power between the one or more inlet ports and the outlet ports via a software defined interface.

Figure 5:
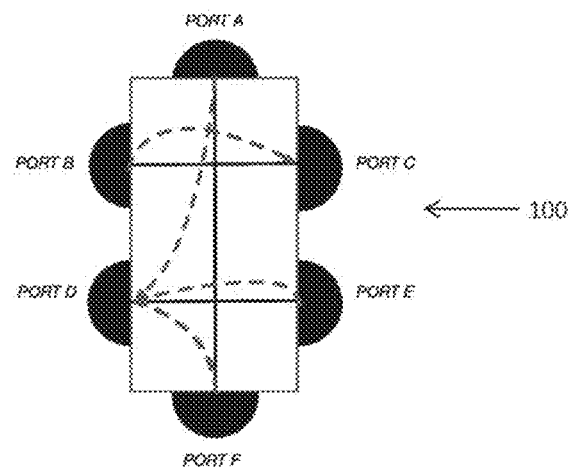
FIG. 5 is a diagram illustrating the directing of power flow between an apparatus having six ports according to an embodiment of the present disclosure.

FIG. 5 is a diagram illustrating the directing of power flow between an apparatus 100 having 6 ports which may be inlet ports and/or outlet ports according to an embodiment of the present disclosure. The dotted-line arrows represent the directions of the respective power flows.

Figure 6:
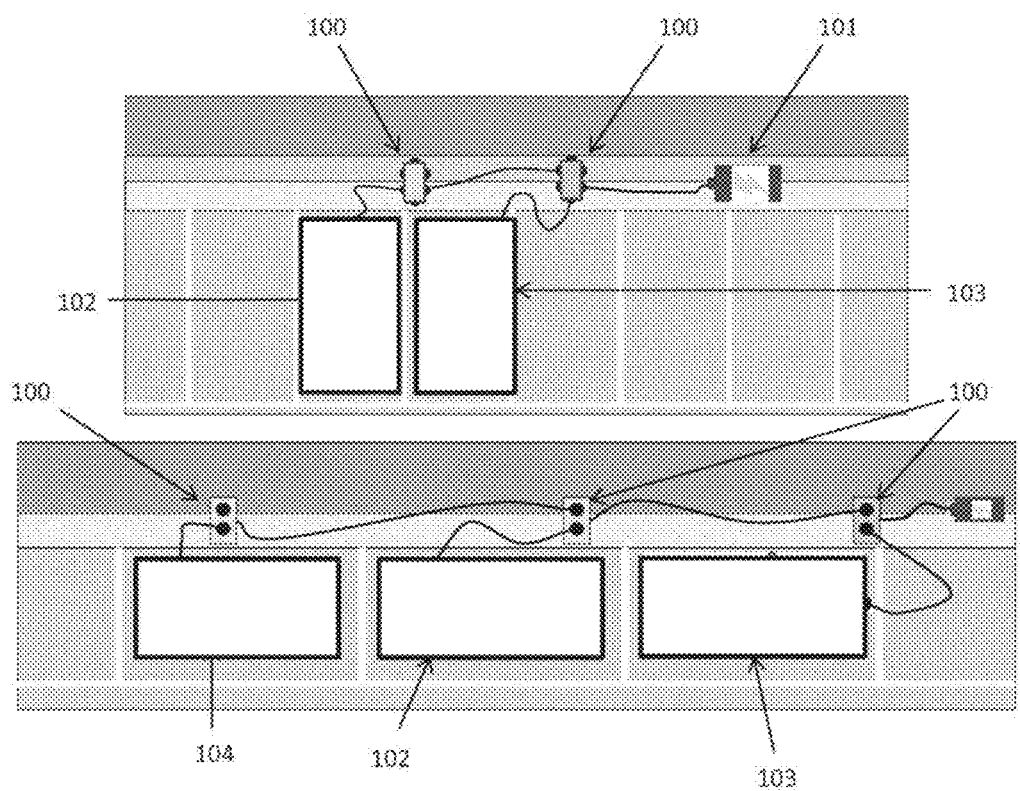
FIG. 6 is a diagram illustrating the directing of power between electrical devices connected in a daisy chain configuration via a plurality of apparatuses according to an embodiment of the present disclosure.

FIG. 6 is a diagram illustrating the directing of power between electrical devices 102-104 connected in a daisy chain configuration via a plurality of apparatuses 100 according to an embodiment of the present disclosure. Further electrical devices may be connected to any one of these apparatuses 100. The electrical devices 102-104 may be electric vehicles.

Figure 7:
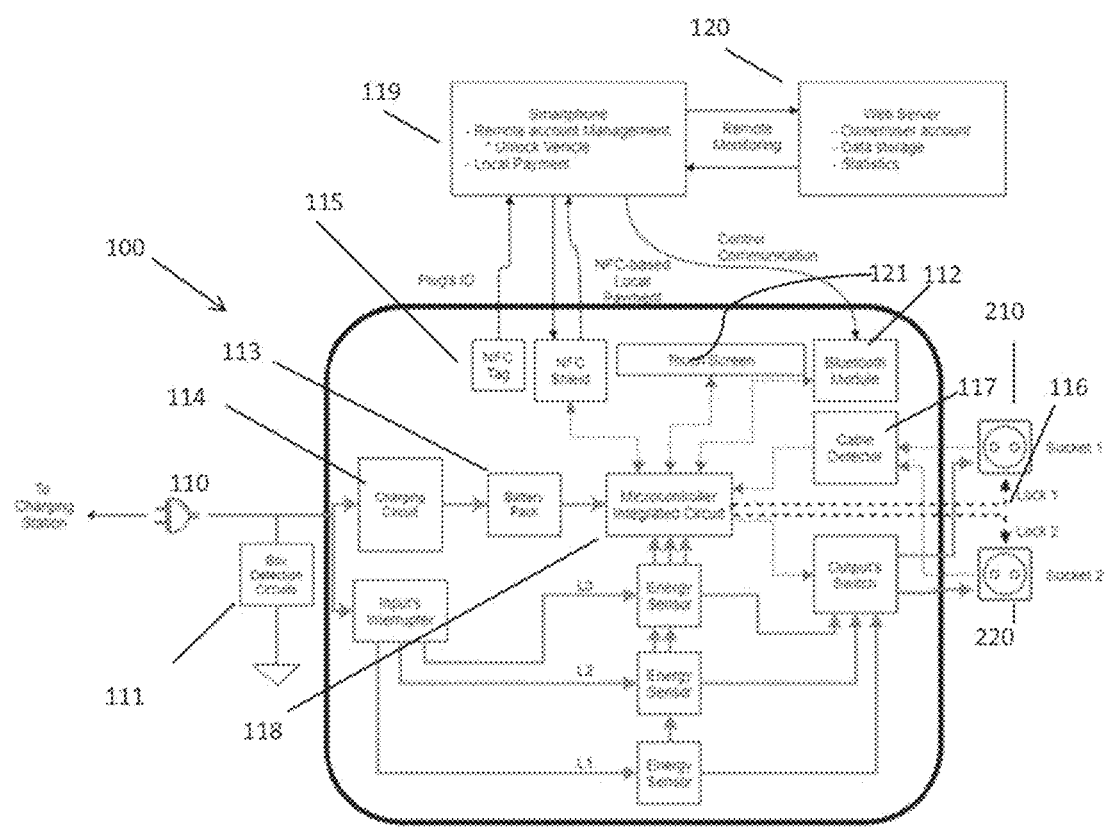
FIG. 7 is a detailed schematic diagram of the apparatus according to an embodiment of the present disclosure.

FIG. 7 is a detailed schematic diagram of the apparatus 100 according to an embodiment of the present disclosure. Referring to FIG. 7, the apparatus 100 may be configured to route power from the input 110 to one or other, or none of the output ports 210, 220. All three phases of the input supply may be switched simultaneously and power of any of the three phases may be supplied to one or other, or none of the output ports 210, 220. Power on each phase can be measured independently (for the purpose of directing charging algorithms and payment schemes). The apparatus 100 may comprise a detection mechanism 111 to allow detection of second or subsequent apparatuses in the chain. In an exemplary embodiment, the detection mechanism 111 may comprise a resistive circuit on the one or more inlet port(s) to allow for detection of second or subsequent apparatuses. A wireless module such as a Bluetooth® module 112 may be provided for two purposes: (i) to enable peer to peer communication between apparatuses; (ii) and to enable communication with a paired smart device. The apparatus 100 may comprise an internal power supply 113 that is automatically charged when connected to a chain. Charging may be facilitated by a charging circuit 114. The internal power supply 113 enables wireless communication even when disconnected from a power supply (see deposit algorithm later). Near-field communication (NFC) tags 115 may be used to facilitate payment for power, security, or releasing the apparatus 100. A cable locking mechanism 116 may be provided to lock cables at the outlets (not shown in diagram), allowing devices downstream of a disconnected apparatus 100 to remain locked. That is, the cable locking mechanism 16 is configured to lock cables of devices downstream of the apparatus 100 to the apparatus 100 when the apparatus 100 is disconnected from an upstream apparatus or a charging point. The cable locking mechanism 116 may be configured to prevent unauthorized users to manually disconnect paired apparatuses. Power for the functionality of the cable locking mechanism 116 may be derived from the internal supply 113 and cables may be detected via a cable detector circuit 117. A microcontroller 118 may facilitate the execution of the various software modules either installed in memory units (not pictured, see FIG. 27) on board the apparatus 100 or communicated via remotely located devices including but not limited to at least one smart device 119 or otherwise. The smart device 119 may facilitate at least one of but limited to account management, device unlocking or payment processing. As such, in one embodiment the smart device 119 may retrieve account data and/or statistics from a remote server 120. A user may furthermore interact with the apparatus 100 and one or more of its functions via an integrally installed user interface which may be a touch screen interface 121.

Protocols for connecting and disconnecting an apparatus 100 may be as follows.

Figure 8:
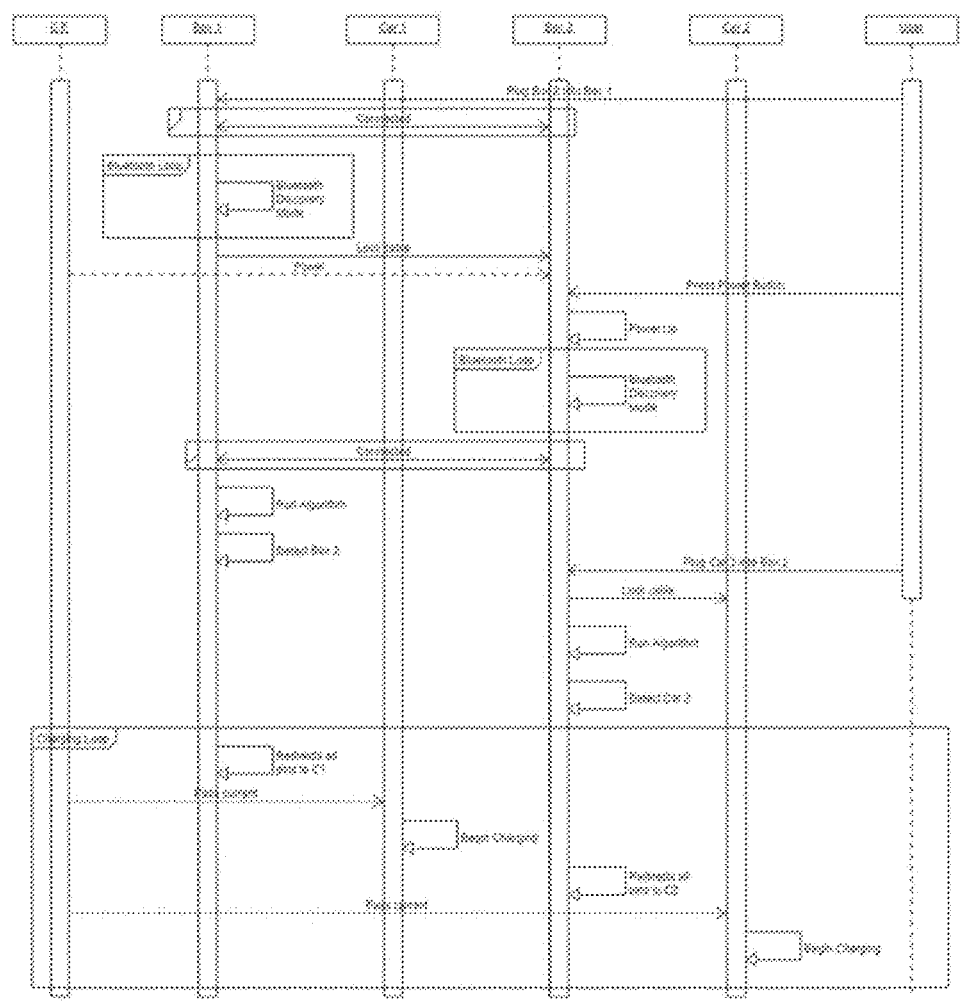
FIG. 8 is a diagram illustrating a plug in protocol according to an embodiment of the present disclosure.

Plug-in protocol, as illustrated in FIG. 8.

Figure 9:
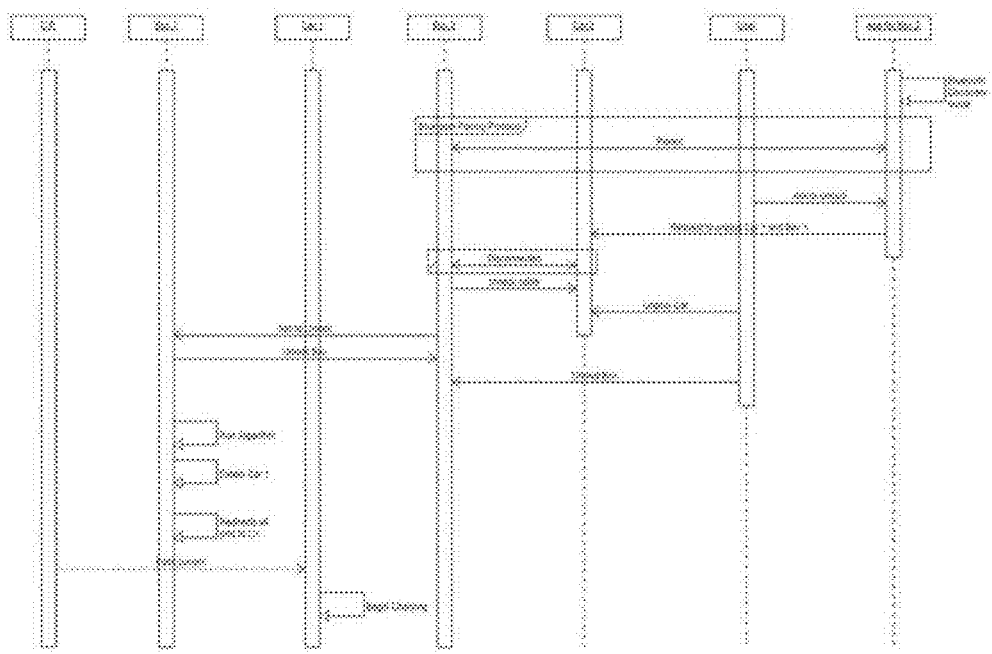
FIG. 9 is a diagram illustrating a removal protocol according to an embodiment of the present disclosure.

1. User plugs in apparatus N into apparatus N−1
2. Apparatus N turns on automatically.
3. Apparatus N−1, apparatus N, and all other apparatuses in the chain connect wirelessly (peer to peer).
4. User plugs vehicle N into apparatus N
5. Charging Process begins Disconnection protocol, as illustrated in FIG. 9.

Figure 10:
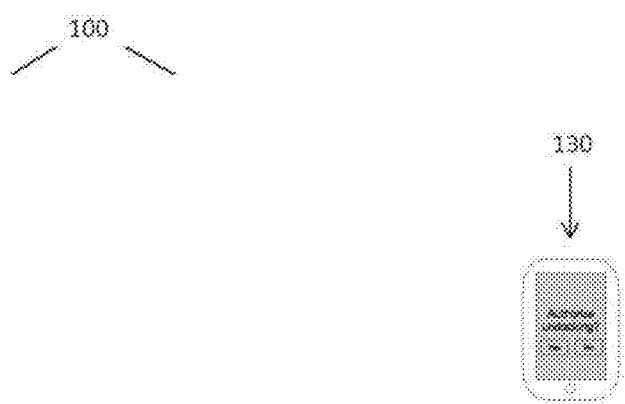
FIG. 10 is a diagram illustrating an unlocking protocol according to another embodiment of the present disclosure.

1. User uses smart device app to ask apparatus N−1 to unlock car N
2. Owner of apparatus N unplugs from apparatus N−1.
3. Apparatus N releases apparatus N+1 and car N connected to apparatus N.
4. User connects apparatus N+1 to apparatus N−1 re-establishing the chain (see Note below).
5. Charging Process begins again FIG. 10 illustrates step 1, wherein a user smart device 130 app is used to ask apparatus N−1 to unlock vehicle N. In another embodiment the device to be unlocked may be a device other than a vehicle, such as but not limited to a mobile device or an IOT device.

The steps of the disconnection protocol will be understood to be equally applicable, for example, in the case of an apparatus N connected to either only a charging point or a charging point and at least one additional apparatus.

A key element of the system is that users who disconnect their apparatus 100 must reconnect the next apparatus in the chain. This can be achieved via:

(a) a ratings system where bad behaving EV owners achieve a low score each apparatus 100 is identified with a unique owner and bad behaving owners are penalised (paying more for electricity, or lower priority access to charging);

(b) or via a deposit system enabled using a payment service (e.g., PayPal®, Visa®) or using a cryptocurrency. Here, apparatuses 1-2- . . . -M are connected from left to right.

Suppose apparatus N (N<M) wishes to disconnect. The apparatus lodges a deposit with apparatus N−1 (or all other apparatuses) using for example, Bitcoin, or MIOTA. The deposit can be proportional to the number of apparatuses connected to the right of apparatus N; i.e. M−N apparatuses. The apparatus is then released by apparatus N−1, and the deposit is returned to apparatus N when the owner reconnects apparatus N+1 to apparatus N−1 (reconnects the chain).

3. Charging Analytics and Security

The apparatus 100 may be programmable and several charging algorithms are possible. It is instructive to consider here a daisy chain with apparatus N connected to apparatus N−1.

A 'water filling' algorithm, wherein only one electrical device is charged at a time. For example, first device N−1 in the chain is charged, then device N, etc.

Equal charge is supplied to all vehicles in the chain (device N and device N−1 receive equal charge).

Premium user charging based on payment (user of device N may have paid a priority fee while user of device N−1 may not have, giving device N priority charging).

Priority based on "good behaviour" (device N receives priority over device N−1 if user of device N has a preferential behaviour record over user of device N−1, e.g. according to the rating system described in a) above).

Prioritisation of charging based on number of occupants; vehicle type (government vehicles, emergency vehicles, shared vehicles) etc.

Prioritisation of charging based on charging requirements of a plurality of electrical devices connected to the apparatus 100, i.e. battery level and/or required journey range. For example device N has critical battery while device N−1 is 90% charged, or a combination of this with, for example, information on required journey range of device N compared with device N−1. A decision may be made based on who needs greater battery in conjunction with journey range.

Time multiplexed charging priority of other kinds; for example if device N has been charging for one hour longer than device N−1, then device N−1 may receive priority.

Market based prioritisation of charging based on trading of slots between users for money (IOTA/Bitcoin). User of device N may exchange currency with user of device N−1 to receive priority.

A number of the above charging protocols use a predetermined metric (e.g. battery level, journey range, behaviour etc.) to determine priority by comparison. Metric parameters other than those described herein may be implemented to the same effect.

Charging protocols to determine length of chain connected to each apparatus 100.

This may be used to provide added security in case of dishonest apparatuses (for example an apparatus 100 trying to disconnect without providing payment, or an apparatus 100 programmed to access charging whilst concealing the number of connected devices and/or without being subject to certain priority-based charging protocols such as the good behaviour protocol). This latter algorithm may be used to detect the number of apparatuses present in a chain of cascaded 'Smart Plug' apparatuses. In one embodiment, the algorithm initially may be performed with one empty socket in the chain, i.e., immediately after an apparatus 100 has been added to the chain and before another apparatus 100 is added. Each apparatus 100 randomly assigns current to a socket every T seconds for the algorithm duration of T with equal probability, e.g. a coin toss. The fraction for which current is not drawn is an indication of the length of the chain. If a new apparatus is detected, an access request may be sent to the apparatus for relevant encrypted protocol data such as behaviour history. The data may contain a series of security markers which identify the information as legitimate. If no information or no legitimate information is received from the request, then flow of power to that apparatus 100 may be ended. The dishonest apparatus 100 or apparatuses and/or device(s) may further be locked in to the chain until payment is provided. In an embodiment where a DLT system is implemented to pair devices, the device N remains locked in until the token has been returned to the paired device N−1 or N+1 via a digital wallet located on a mobile device for example. In a further embodiment, the locking mechanism on an apparatus that is not in use is kept locked shut until an access request is sent from the user mobile device app and/or the user's apparatus 100 for legitimate encrypted protocol history data.

In one embodiment, any of the charging protocols above may comprise providing power of different phases to the various electrical devices connected, according to their priority. For example if device N has priority over device N−1, then device N may receive 3-phase electrical power from the apparatus 100 while device N−1 may receive single-phase or 2-phase electrical power from the apparatus 100.

Figure 11:
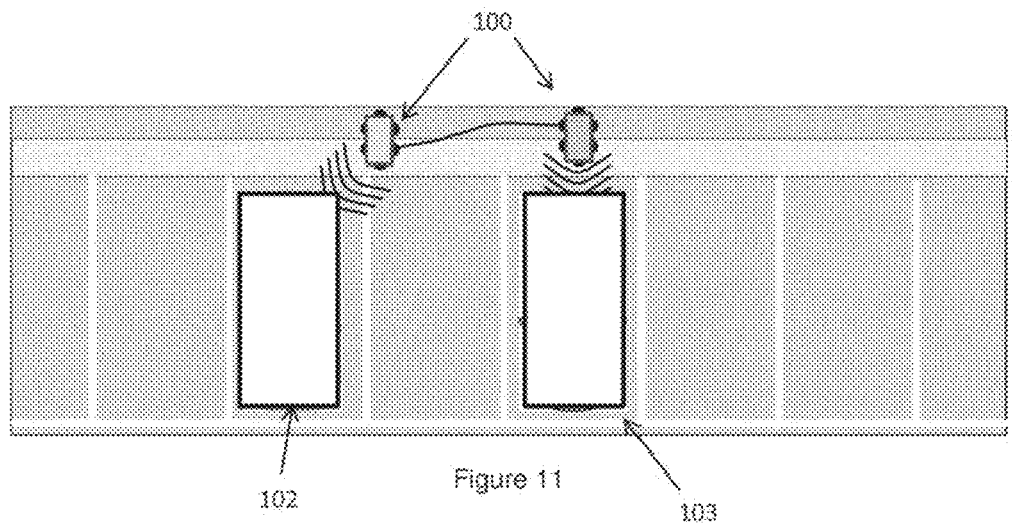
FIG. 11 is a diagram illustrating a plurality of electric vehicles configured for wireless charging via an apparatus according to an embodiment of the present disclosure.

Referring to FIG. 11, the apparatus 100 may be further capable of wireless charging electrically powered devices 102, 103. FIG. 11 is a diagram illustrating a plurality of electrically powered devices 102, 103, such as electric vehicles, configured for wireless charging via the apparatus 100 according to an embodiment of the present disclosure. The wireless charging may be implemented using the same wireless module which provides peer to peer connection between apparatuses. In one embodiment, this may allow routing of power between any number of devices in a network of arbitrary interconnections via at least one apparatus 100 (see FIG. 25).

Figure 12:
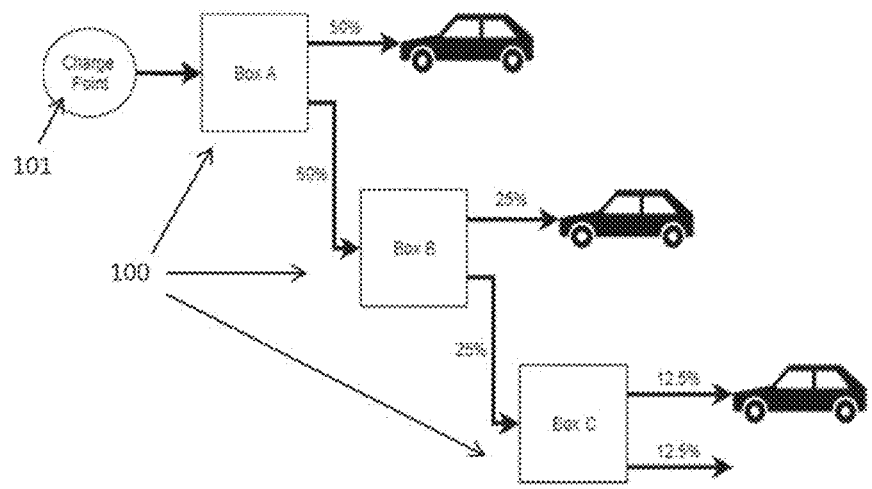
FIG. 12 is a diagram illustrating a charging protocol for detecting the number of cars in a chain, according to an embodiment of the present disclosure.

FIG. 12 is a diagram illustrating a charging protocol for detecting the number of electric vehicles in a chain according to an embodiment of the present disclosure. Referring to FIG. 12, an apparatus 100 assigns current randomly to each socket. If a socket is empty, current is not drained. The computing device can determine the percentage of time current is not drained.

For example:
12.5% of the time the current is not drained
12.5/100=½"n
where n=number of apparatuses in the chain.

The apparatus 100 of the present disclosure alleviate, or even completely eliminate charge point anxiety by enabling a plurality of the apparatus 100 to be connected together in a daisy chain configuration.

Figure 13:
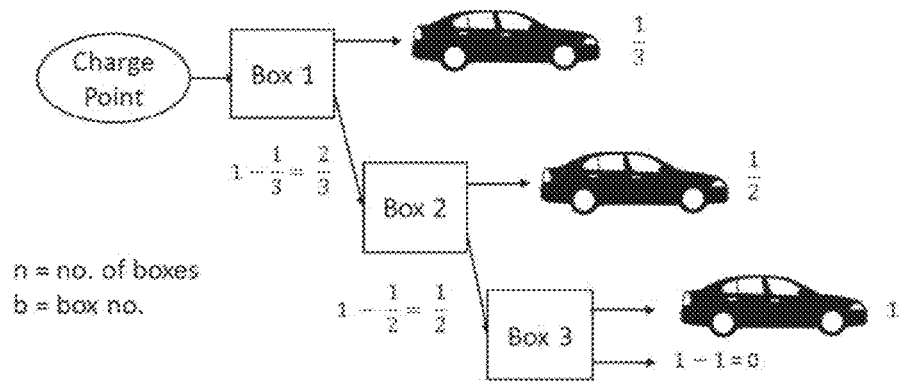
FIG. 13 is a diagram illustrating a charging protocol according to another embodiment of the present disclosure.

FIG. 13 is a diagram illustrating a charging protocol according to an embodiment of the present disclosure, in which to redistribute charge equally according to the equal charge charging protocol, the formula $$\text{Fraction of power to box } b = \frac{1}{n - (b - 1)}$$

may be used, where n is the number of boxes and b is the box number. FIG. 13 illustrates an embodiment of this algorithm involving three devices (n=3) connected to a charge point via a plurality of the apparatus 100 in a daisy chain configuration. Box 1 (b=1) has:

$$\frac{1}{3 - (1 - 1)} = \frac{1}{3}$$

Thus box 1 receives one third of the power from the charge point. This leaves two thirds of the power to be transferred to subsequent apparatuses. Box 2 has:

$$\frac{1}{3 - (2 - 1)} = \frac{1}{2}$$

Thus box 2 receives one half of the remaining power:

⅔×½=⅓

Box 2 and box 1 are therefore receiving the same fraction of the charge points power supply. Clearly there is one third of the total power remaining, one third having gone to each of boxes 1 and 2. Box 3 has:

$$\frac{1}{3 - (3 - 1)} = 1$$

Therefore box 3 receives 100% of the remaining power, and so receives one third of the total charge point power supply as did boxes 1 and 2. Thus all three boxes and devices received the same power. Other formulations of this algorithm exist other than that presented here which achieve the same effect.

Figure 14:
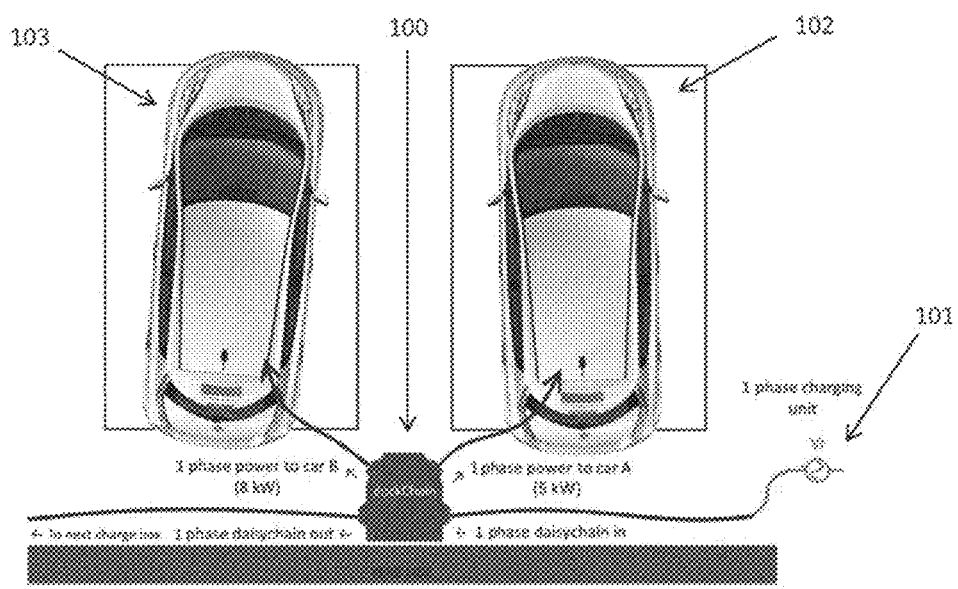
FIG. 14 is a diagram illustrating a charging protocol according to another embodiment of the present disclosure.
Figure 15:
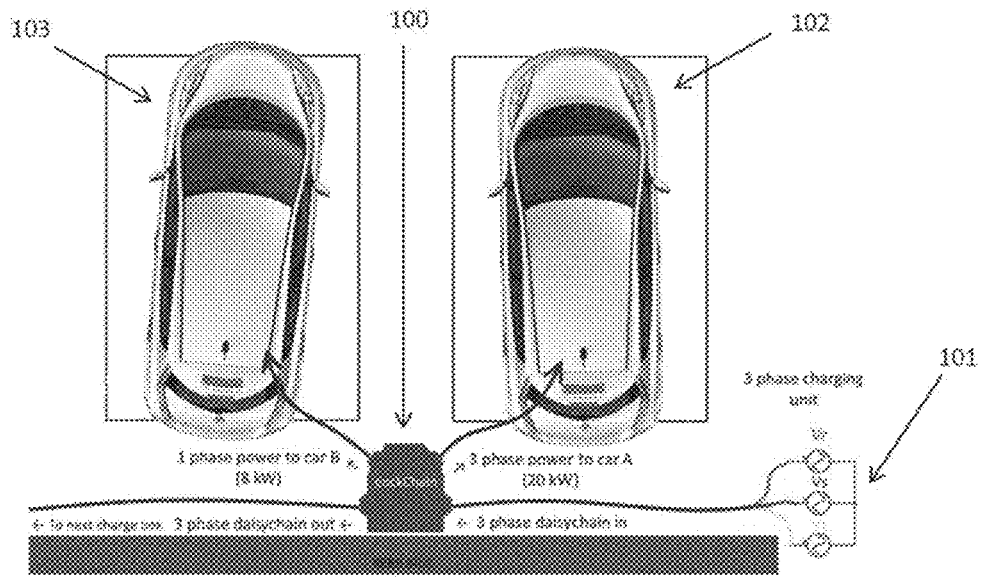
FIG. 15 is a diagram illustrating a charging protocol according to another embodiment of the present disclosure.

Referring to FIG. 14, in one embodiment the apparatus 100 is configured to route single-phase power of 5 kW to an electrically powered device 102 and furthermore single-phase power of 8 kW to a second electrically powered device 103, while single-phase power is routed through the apparatus 100 to one or more further apparatuses connected in the daisy chain configuration. This provides an example of one device receiving charge priority over at least one additional device, according to one or a combination of the charging protocols. Moreover, the apparatus 100 may be configured such that the power routed to at least one of the devices 102, 103 may differ in both phase and magnitude (in, for example, units of Watts). Furthermore the apparatus 100 may be configured such that the power routed from the one or more charge points 101 to the apparatus 100 to any further apparatuses in the daisy chain configuration may be of a different phase to that detailed described above. An example of a further embodiment to this effect is illustrated in FIG. 15.

Figure 16:
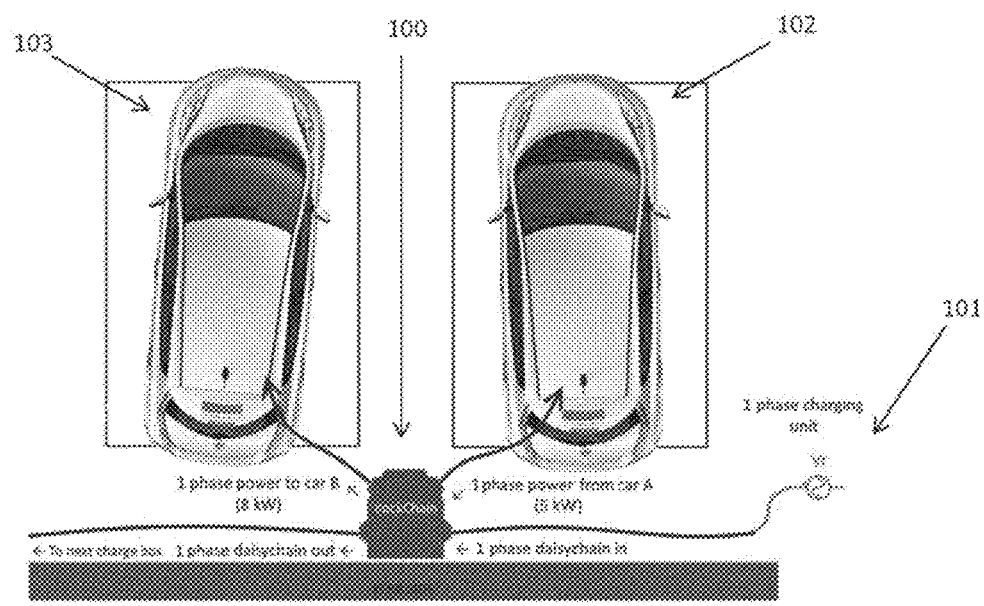
FIG. 16 is a diagram illustrating a charging protocol according to another embodiment of the present disclosure.

Referring to FIG. 16, in one embodiment the apparatus 100 is configured to reroute single-phase power flow from an electrically powered device 102 to a second electrically powered device 103, while single-phase power is routed through the apparatus 100 to one or more additional apparatuses connected in the daisy chain configuration. Accordingly, a network of arbitrary interconnections comprising a network enabled service layer may be provided where users may sell power from their devices to one another (see FIG. 25). Moreover, other power phase flows to and from devices may be provided for example an embodiment in which single-phase power is routed from a device 102 to a device 103 which receives 3-phase power. In other embodiments, power may be rerouted, whether of the same phase or different, from one or more devices to a plurality of other devices.

Figure 17:
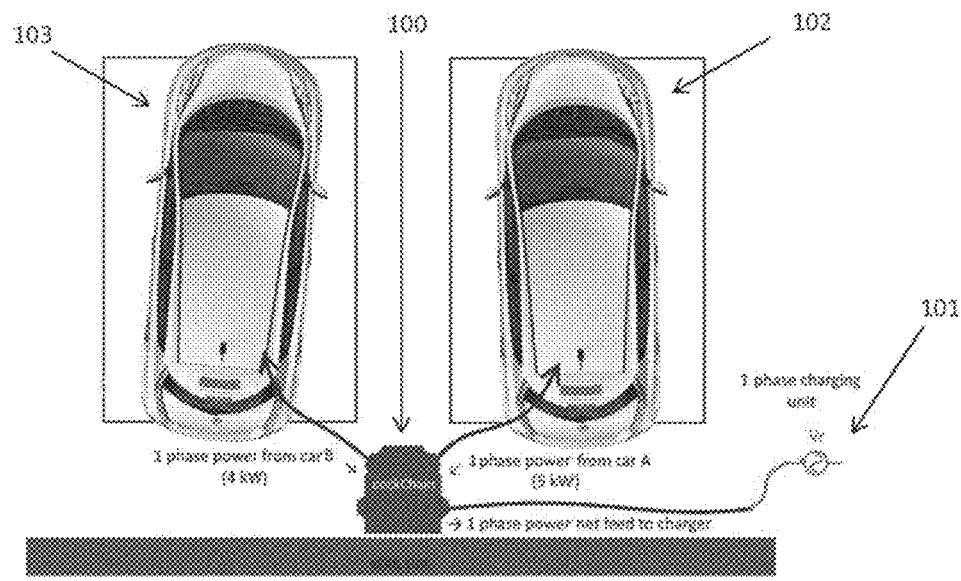
FIG. 17 is a diagram illustrating a charging protocol according to another embodiment of the present disclosure.

FIG. 17 depicts another embodiment of the apparatus 100 of the present disclosure in which single-phase power is routed from both devices 102, 103 in a chain to the charge point 101. Other power phase flows from devices may be implemented for example an embodiment in which single-phase power is routed from a device 102 to a charge point which receives while 3-phase power is routed from a device 103 to the same charge point 101. Another embodiment provides that power may be rerouted, whether of the same phase or different, from one or more devices to a plurality of charge points 101.

Figure 18:
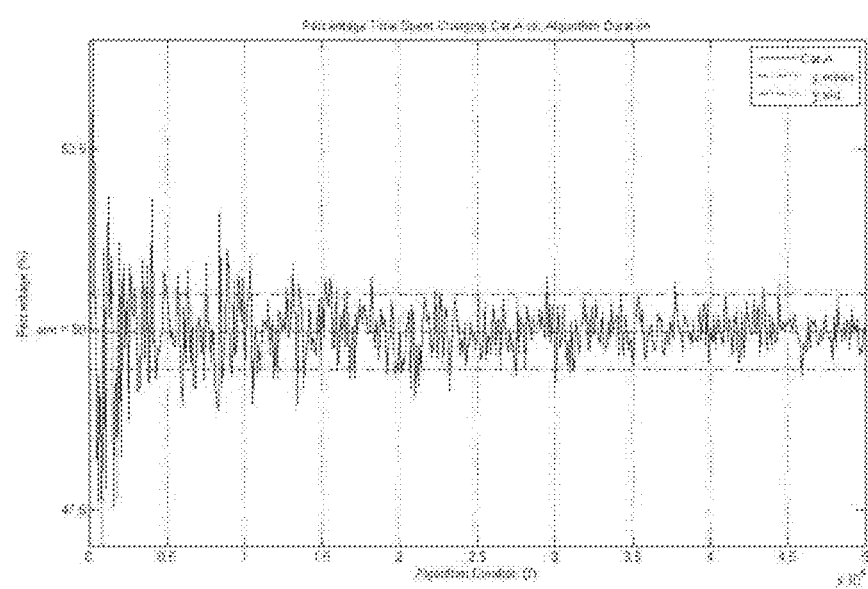
FIGS. 18 to 20 are graphs illustrating a percentage of time spent charging versus algorithm duration.
Figure 19:
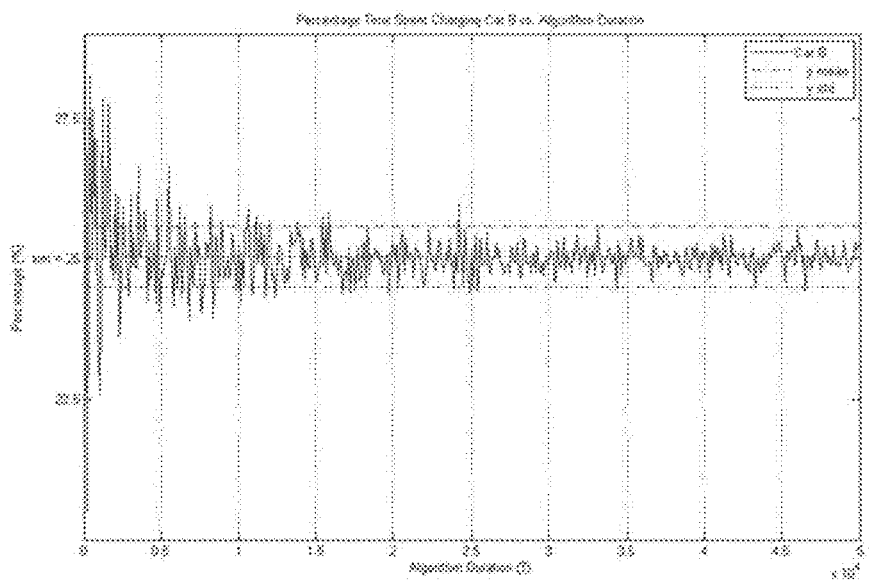
Figure 20:
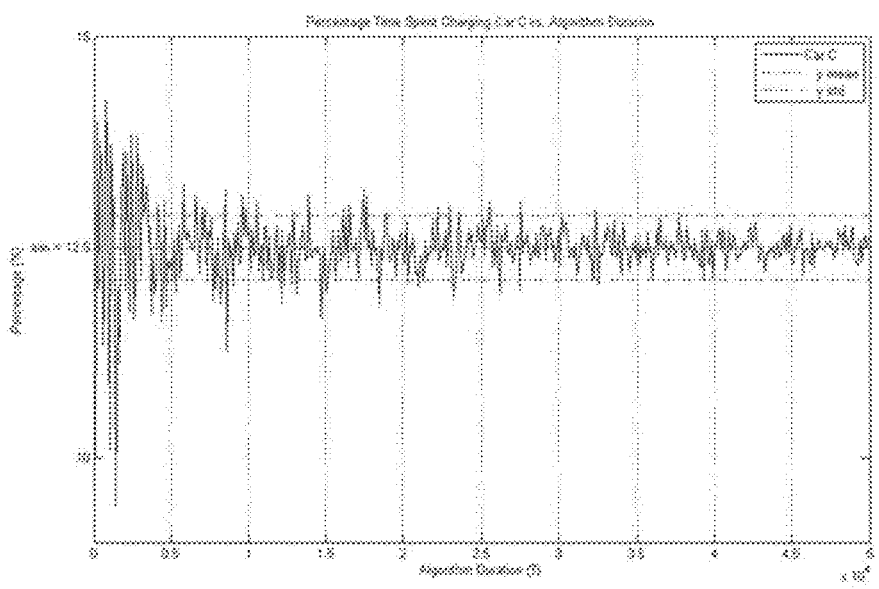

FIGS. 18 to 20 are graphs illustrating a percentage of time spent charging versus algorithm duration.

Figure 21:
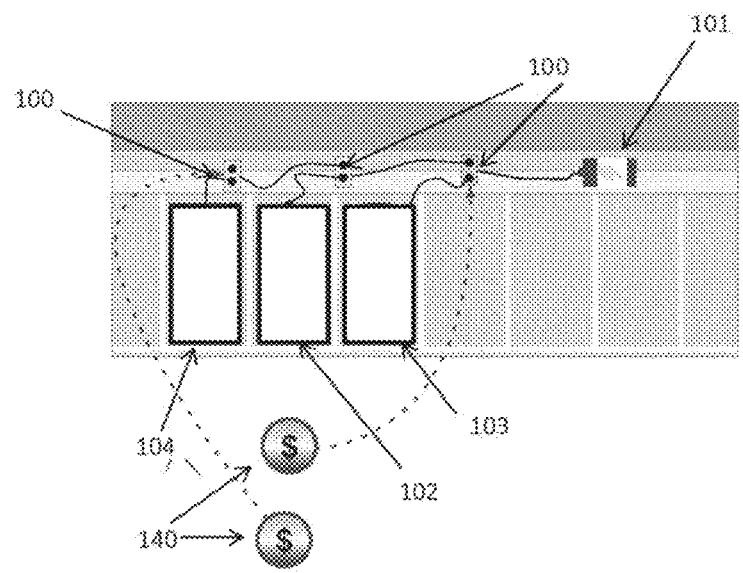
FIG. 21 is a diagram illustrating an embodiment of the present disclosure wherein users of a number of the apparatuses access use of said apparatuses via a token system.

FIG. 21 is a diagram illustrating an embodiment of the present disclosure wherein users of a number of the apparatuses 100 access use of said apparatuses 100 via a token system 140. In one embodiment, the token system 140 may be implemented in combination with the previously described deposit system for penalising poor behaviour on the part of users in relation to reconnecting apparatuses 100 when the user disconnects (see description relating to disconnection protocol).

Figure 22:
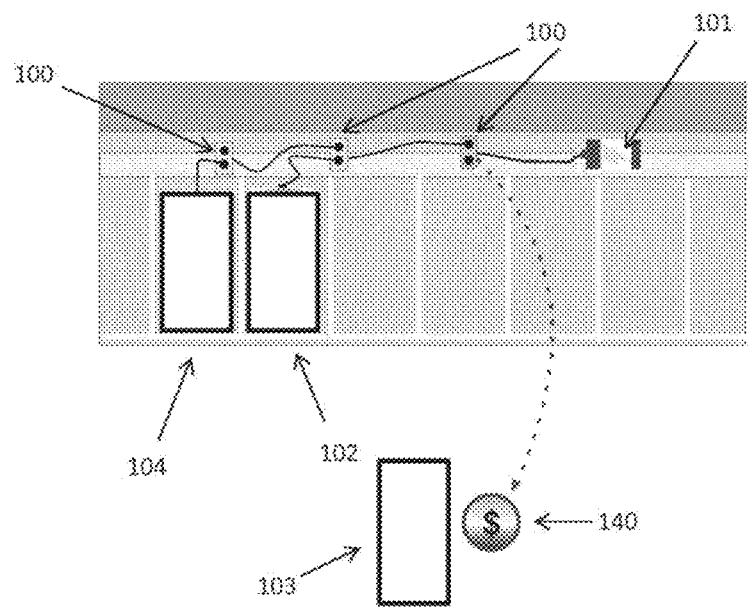
FIG. 22 is a diagram illustrating the return of a token to a user of an apparatus according to an embodiment of the present disclosure.

FIG. 22 is a diagram illustrating the return of a token 140 to a user of an apparatus 100 according to an embodiment of the present disclosure. In one embodiment, the token 140 may be returned to the user after reconnecting apparatuses 100 either side of them when disconnecting their own apparatus 100.

Figure 23:
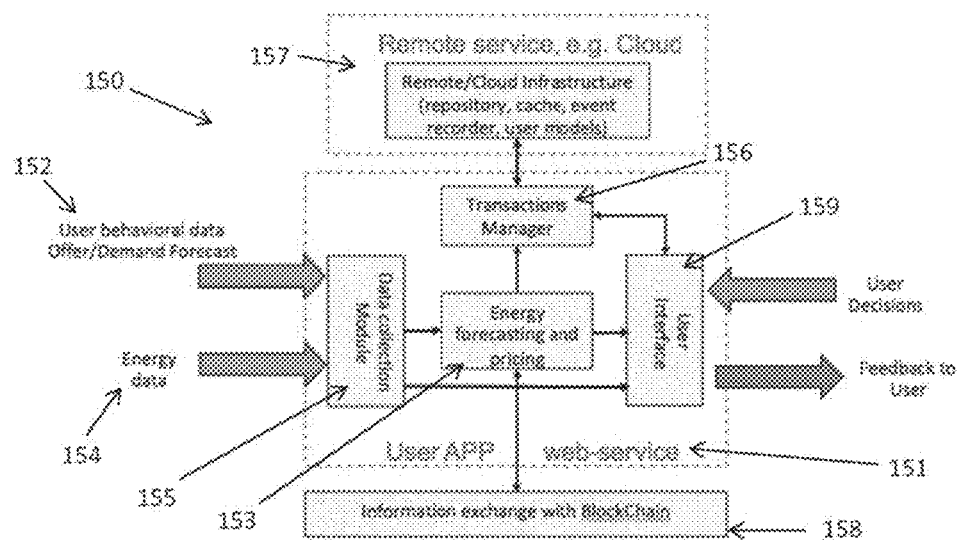
FIG. 23 is a schematic diagram of a monetization system related to an apparatus according to an embodiment of the present disclosure.

FIG. 23 is a schematic diagram of a monetization system 150 related to an apparatus 100 according to an embodiment of the present disclosure wherein the configured power flow is monetized via a web-interface 151. The monetization system 150 may be based on a user profile 152 and demand forecasting 153. Forecasting may be conducted in conjunction with energy data input 154 to a data collection module 155 which is furthermore either operably associated with a processing unit (not pictured) or integrally contains a processing unit. Pricing is then processed via a transactions manager 156 and any information relating to pricing is then relayed to a remote server 157 which may be cloud based. The system 150 may further exchange information with a blockchain 158. A user may interact with the system via a user interface 159. The user interface 159 may comprise a display module which may be touch screen.

Figure 24:
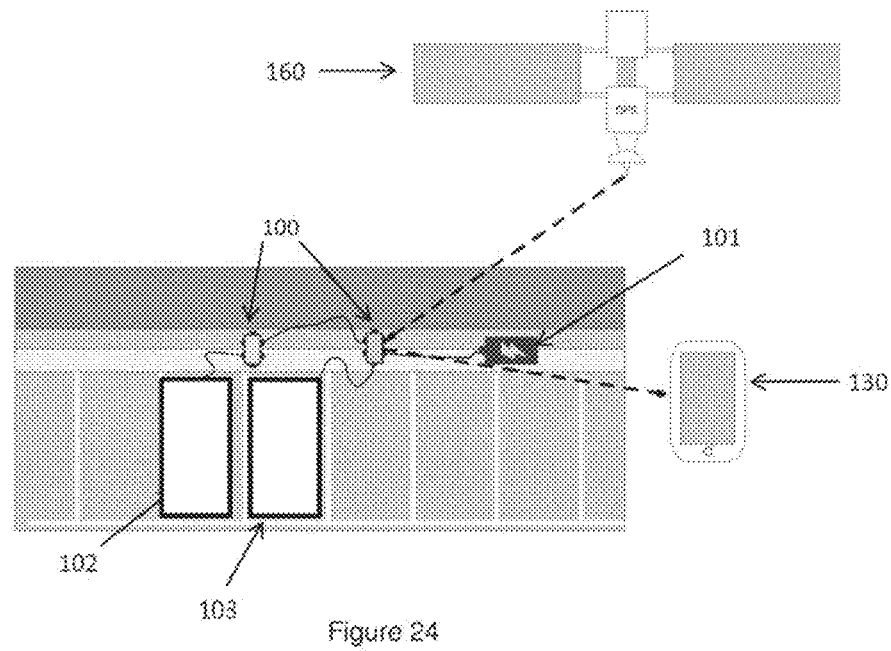
FIG. 24 is a diagram illustrating an apparatus of the present disclosure in communication with a GPS satellite and at least one mobile device, according to an embodiment of the present disclosure.

FIG. 24 is a diagram illustrating an apparatus 100 in communication with a GPS satellite 160 and at least one mobile device 130, according to an embodiment of the present disclosure. In this embodiment, the location of the apparatus 100 may be determined, for example after the user has spent a period away from the apparatus 100 and wishes to locate it again. The association of the GPS system with an apparatus 100 may be used for other functional purposes including but not limited to reporting position information relating to system or apparatus 100 incidents to a remote server. The apparatus 100 of the present disclosure may be associated operably with any existing satellite navigation system other than GPS including but not limited to GLO-NASS, and possible future operational satellite navigation systems.

Figure 25:
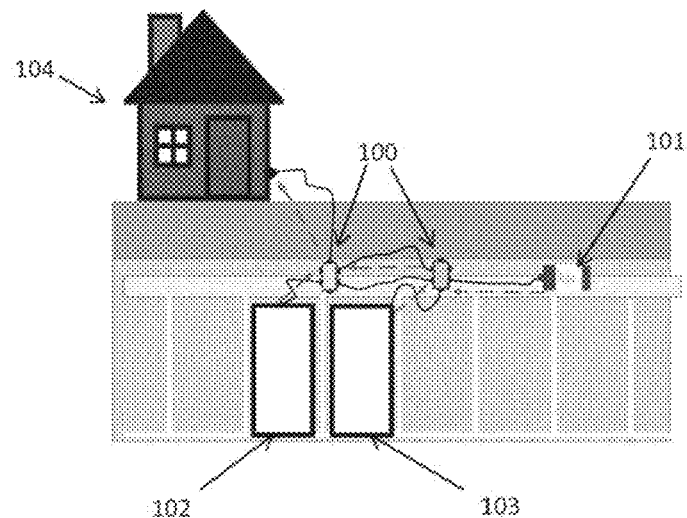
FIG. 25 is a diagram illustrating a charging protocol according to another embodiment of the present disclosure.

In the exemplary embodiment, the system of apparatuses may be configured to create a network of arbitrary interconnections to distribute power with reconfigurable access control. FIG. 25 is a diagram illustrating an embodiment of a charging protocol for a network enabled service layer, where two cars 102, 103 and a charge point 101 deliver power to a house 104. Arrows denote the direction of power flow. The network enables at least one user to route power from one or more devices associated with one or more respective apparatus N to one or more other devices also connected in the network. More generally, FIG. 25 is a diagram illustrating a charging protocol according to another embodiment of the present disclosure in which a system comprising a plurality of the apparatus 100 are used to create a network of arbitrary interconnections to distribute power with reconfigurable access control. Accordingly, other combinations of devices are possible, including but not limited to ad-hoc vehicle-to-vehicle, vehicle-to-grid and/or grid-to-vehicle services. The network enabled service may permit a user to take third-party ownership of power and implement various charging policies, as well as providing infrastructure access and including advanced queuing policies. For example, this would allow an owner of a motor vehicle connected to the system to sell power from their car to the national grid or to the owner of an electrical device connected to the system. In embodiments of the present disclosure, charging and queuing policies selectable by the owner may work in conjunction with, or override, those policies outlined above.

Figure 26:
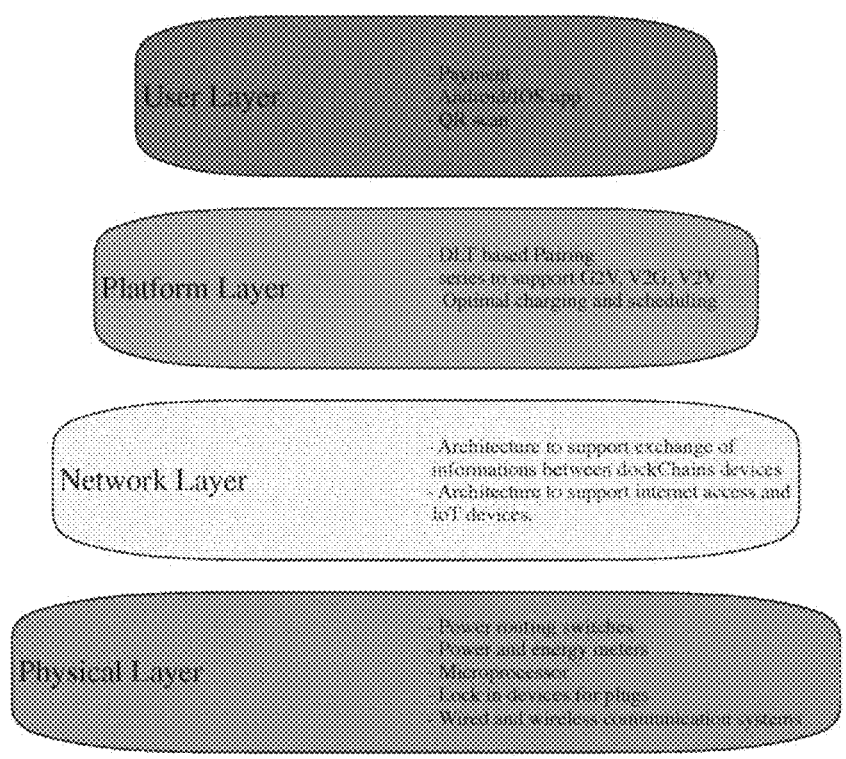
FIG. 26 is a diagram illustrating a network layer architecture of the apparatus, according to an embodiment of the present disclosure.

FIG. 26 is a diagram illustrating a network layer architecture of the system, according to an embodiment of the present disclosure. Referring to FIG. 26, multiple layers including a user layer, platform layer, network layer and physical layer are developed on top of each other to provide modularity and flexibility to the system. That is, each layer can be modified independently from all the other layers.

Figure 27:
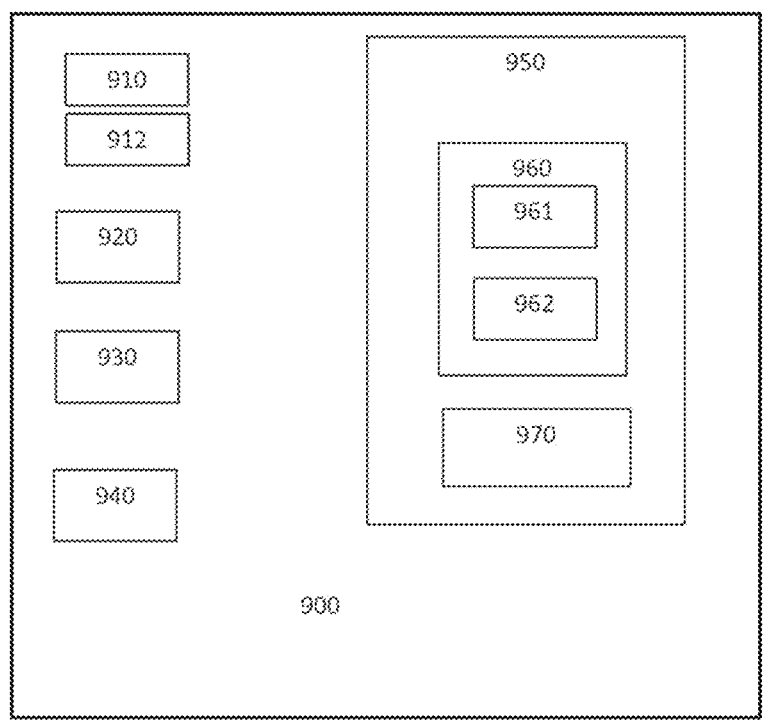
FIG. 27 is a block diagram illustrating a configuration of a computing device which includes various hardware and software components that function to perform processes according to embodiments of the present disclosure.

FIG. 27 is a block diagram illustrating a configuration of a computing device 900 which includes various hardware and software components that function to perform processes according to the present disclosure. The computing device 900 corresponds to the computing device 900 of the apparatus 100 of FIG. 1, configured to route power from the one or more inlet port(s) to the at least two outlet ports. Referring to FIG. 27, the computing device 900 comprises a user interface 910, a processor 920 in communication with a memory 950, and a communication interface 930. The processor 920 functions to execute software instructions that can be loaded and stored in the memory 950. The processor 920 may include a number of processors, a multi-processor core, or some other type of processor, depending on the particular implementation. The memory 950 may be accessible by the processor 920, thereby enabling the processor 920 to receive and execute instructions stored on the memory 950. The memory 950 may be, for example, a random access memory (RAM) or any other suitable volatile or non-volatile computer readable storage medium. In addition, the memory 950 may be fixed or removable and may contain one or more components or devices such as a hard drive, a flash memory, a rewritable optical disk, a rewritable magnetic tape, or some combination of the above.

One or more software modules 960 may be encoded in the memory 950. The software modules 960 may comprise one or more software programs or applications having computer program code or a set of instructions configured to be executed by the processor 920. Such computer program code or instructions for carrying out operations for aspects of the systems and methods disclosed herein may be written in any combination of one or more programming languages.

The software modules 960 may include at least a first application 961 and a second application 962 configured to be executed by the processor 920. During execution of the software modules 960, the processor 920 configures the computing device 900 to perform various operations relating to the embodiments of the present disclosure, as has been described above.

Other information and/or data relevant to the operation of the present systems and methods, such as a database 970, may also be stored on the memory 950. The database 970 may contain and/or maintain various data items and elements that are utilized throughout the various operations of the system described above, including but not limited to the behavior ranking system described in relation to charging protocols. It should be noted that although the database 970 is depicted as being configured locally to the computing device 900, in certain implementations the database 970 and/or various other data elements stored therein may be located remotely. Such elements may be located on a remote device or server—not shown, and connected to the computing device 900 through a network in a manner known to those skilled in the art, in order to be loaded into a processor and executed.

Further, the program code of the software modules 960 and one or more computer readable storage devices (such as the memory 950) form a computer program product that may be manufactured and/or distributed in accordance with the present disclosure, as is known to those of skill in the art.

The communication interface 940 is also operatively connected to the processor 920 and may be any interface that enables communication between the computing device 900 and other devices, machines and/or elements. The communication interface 940 is configured for transmitting and/or receiving data. For example, the communication interface 940 may include but is not limited to a Bluetooth, or cellular transceiver, a satellite communication transmitter/receiver, an optical port and/or any other such, interfaces for wirelessly connecting the computing device 900 to the other devices.

The user interface 910 is also operatively connected to the processor 920. The user interface may comprise one or more input device(s) such as switch(es), button(s), key(s), and a touchscreen.

The user interface 910 functions to facilitate the capture of commands from the user such as on-off commands or settings related to the operation of the system described above. The user interface 910 may function to issue remote instantaneous instructions on images received via a non-local image capture mechanism.

A display 912 may also be operatively connected to the processor 920. The display 912 may include a screen or any other such presentation device that enables the user to view various options, parameters, and results. The display 912 may be a digital display such as an LED display. The user interface 910 and the display 912 may be integrated into a touch screen display.

The operation of the computing device 900 and the various elements and components described above will be understood by those skilled in the art with reference to the apparatus 100 and system according to the present disclosure.

It will be understood that while exemplary features of an apparatus 100 for directing power flow between multiple devices have been described, such an arrangement is not to be construed as limiting the present teaching to such features. The functionality for directing power flow between multiple devices (and furthermore according to various charging protocols) may be implemented in software, firmware, hardware, or a combination thereof. In one mode, functionality is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. The functionality may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functionality of the present teaching. The processor(s) is a hardware device for executing software, particularly software stored in memory. Processor(s) can be any custom made or commercially available processor, a primary processing unit (CPU), an auxiliary processor among several processors associated with a computer, a semiconductor based microprocessor (in the form of a microchip or chip set), a macro-processor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions in order to implement the functions of the modules. In the example of heretofore described, the software in memory is executable on a suitable operating system (O/S).

The present disclosure may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the functionality is implemented in software, it should be noted that such software can be stored on any computer readable medium for use by or in connection with any computer related system or method. In the context of the present teaching, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus 100, or device, such as a computer-based system, processor-containing system, or other system that can fetch the instructions from the instruction execution system, apparatus 100, or device and execute the instructions. In the context of the present disclosure, a "computer-readable medium" can be any means that can store, communicate, propagate, or transport the program for use by or in connection with the instruction execution system, apparatus 100, or device. The computer readable medium can be for example, but not limited to, an electronic, magnetic, optical, electromagnetic, infrared, or semiconductor system, apparatus 100, device, or propagation medium. Any process descriptions or blocks in the figures, should be understood as representing modules, segments, or portions of code which include one or more executable instructions for implementing specific logical functions or steps in the process, as would be understood by those having ordinary skill in the art.

The above detailed description of embodiments of the disclosure is not intended to be exhaustive nor to limit the disclosure to the exact form disclosed. While specific examples for the disclosure are described above for illustrative purposes, those skilled in the relevant art will recognize various modifications are possible within the scope of the disclosure. For example, while processes and blocks have been demonstrated in a particular order, different implementations may perform routines or employ systems having blocks, in an alternate order, and some processes or blocks may be deleted, supplemented, added, moved, separated, combined, and/or modified to provide different combinations or sub-combinations. Each of these processes or blocks may be implemented in a variety of alternate ways. Also, while processes or blocks are at times shown as being performed in sequence, these processes or blocks may instead be performed or implemented in parallel or may be performed at different times. The results of processes or blocks may be also held in a non-persistent store as a method of increasing throughput and reducing processing requirements.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described.

Similarly the words comprises/comprising when used in the specification are used to specify the presence of stated features, integers, steps or components but do not preclude the presence or addition of one or more additional features, integers, steps, components or groups thereof.

The invention claimed is:

1. An apparatus for directing power flow between multiple devices, the apparatus comprising:
   one or more inlet ports for connection to one or more respective devices;
   a plurality of outlet ports configured for supplying electrical power;
   a computing device configured to route power from the one or more inlet ports to the plurality of outlet ports; and
   a cable locking mechanism to prevent unauthorized users from manually disconnecting paired apparatuses, where the cable locking mechanism is configured to lock cables of devices downstream of the apparatus to the apparatus when the apparatus is disconnected from an upstream apparatus or a charging point.

2. The apparatus of claim 1, being configured to direct power flow from at least one charging point to one or more electrically powered devices.

3. The apparatus of claim 1, being configured to redirect power flow from one or more electrically powered devices to one or more charging points.

4. The apparatus of claim 1, being configured to redirect power flow between a plurality of electrically powered devices.

5. The apparatus of claim 1, being configured for charging electric vehicles, e-bikes, and e-scooters.

6. The apparatus of claim 5, wherein, when charging an electric vehicle, the charging protocol comprises determining at least one of the number of occupants of the vehicle, the classification of occupants of the vehicle, and the classification of the vehicle itself, and determining charging priority accordingly.

7. The apparatus of claim 1, being configured for connection to an electric vehicle charging point, a computing device charging point or an Internet of Things (IOT) charging point.

8. The apparatus of claim 1, wherein the computing device comprises one or more processors configured to route power from the one or more inlet ports to the outlet ports according to a charging protocol.

9. The apparatus of claim 8, wherein the charging protocol is determined according to charging requirements of a plurality of electrical devices connected to the apparatus.

10. The apparatus of claim 8, wherein the charging protocol comprises dictating that only one electrical device can be charged at any time.

11. The apparatus of claim 8, wherein the charging protocol comprises time multiplexed charging of the plurality of electrical devices.

12. The apparatus of claim 8, wherein the charging protocol comprises providing power of different phases to at least two of the plurality of electrical devices.

13. The apparatus of claim 8, wherein the charging protocol is determined based on a profile of each of the plurality of electrical devices.

14. The apparatus of claim 13, wherein the profile comprises at least one of a previous charging history or a charge payment history associated with an electrical device, a charge urgency of an electrical device in relation to other electrical devices connected to the at least one charging point, recorded behaviour history of a user, or currency exchange history between one user and at least one further user of the at least one charging point.

15. The apparatus of claim 8, wherein the charging protocol comprises determining the number of other apparatuses connected to the apparatus, both directly and indirectly, in order to allocate the power to the multiple apparatuses.

16. The apparatus of claim 1, comprising a near-field communication (NFC) module for facilitating payment for charging or releasing the apparatus.

17. The apparatus of claim 1, comprising one or more processors configured to route power between the inlet ports and the outlet ports via a software defined interface.

18. The apparatus of claim 1, wherein the computing device comprises a wireless module configured to enable peer to peer communication between the apparatus and other devices.

19. The apparatus of claim 18, being configured for wireless charging of electric devices.

20. The apparatus of claim 18, being configured to implement a distributed ledger network with user payment devices.

21. The apparatus of claim 20, wherein the distributed ledger network comprises a blockchain network.

22. The apparatus of claim 20, being configured to pair devices using distributed ledger network tokens.

23. The apparatus of claim 1, comprising an internal power supply to enable wireless communication.

24. The apparatus of claim 1, comprising a geonavigation device for determining the location of the apparatus and enabling location based services.

25. The apparatus of claim 1, being configured to be connected to one or more apparatus of any preceding claim.

26. The apparatus of claim 1, comprising a detection mechanism to detect a second or subsequent apparatus connected in a daisy chain configuration.

27. A system for directing power flow between multiple devices, the system comprising a plurality of the apparatus of claim 1 connected to each other.

28. The system of claim 27, being configured for extending one or more charge points to multiple electrically powered devices.

29. The system of claim 27, comprising a plurality of the apparatus connected in a daisy chain configuration.

30. The system of claim 29, wherein the plurality of the apparatus are connected wirelessly in a peer to peer manner.

31. The system of claim 29, wherein the computing device of an apparatus N in the daisy chain configuration is configured to activate apparatus N when apparatus N is connected to apparatus N−1.

32. The system of claim 29, wherein, when a device N is connected to apparatus N, the charging of device N begins.

33. The system of claim 29, being configured to charge an apparatus N−1 before an apparatus N is charged.

34. The system of claim 29, being configured to provide power of different phases to apparatuses N−1 and N.

35. The system of claim 29, being configured to supply an equal charge to an apparatus N−1 and an apparatus N.

36. The system of claim 29, being configured to supply an equal charge to a device N and a device N−1.

37. The system of claim 29, being configured to supply charge to device N at a greater rate than device N−1, if device N has a lower battery level and/or more specific journey range compared to device N−1.

38. The system of claim 29, being configured to supply charge to device N at a greater rate than device N−1, if the owner of device N has paid a priority fee which the owner of device N−1 has not paid.

39. The system of claim 29, being configured to supply charge to device N at a greater rate than device N−1, if the owner of device N ranks higher than the owner of device N−1 in a recorded behaviour ranking system.

40. The system of claim 39, comprising a database for storing information relating to the behaviour ranking system, as well as other information relevant to the operation of the system.

41. The system of claim 40, wherein the database is configured locally to the computing device of a given apparatus of the system.

42. The system of claim 40, wherein the database is located remotely in relation to a given apparatus or apparatuses of the system.

43. The system of claim 29, being configured to supply charge to device N at a greater rate than device N−1, if the owner of device N ranks higher than the owner of device N−1 in a predetermined metric.

44. The system of claim 43, wherein, when used to charge electric vehicles, the metric comprises at least one of a number of vehicle occupants, a classification of vehicle occupants and a vehicle classification itself.

45. The system of claim 29, being configured to supply charge to device N at a greater rate than device N−1, if the owner of apparatus N has exchanged currency with the owner of device N−1 to obtain charging priority.

46. The system of claim 29, being configured to provide time multiplexed charging to at least devices N and N−1.

47. The system of claim 27, wherein the cable locking mechanism of an apparatus N connected either only to a charging point or to the charging point and an apparatus N+1 remain locked unless the authorised user of apparatus N submits a request for unlocking via a requesting means.

48. The system of claim 27, wherein the cable locking mechanism of an apparatus N connected with at least one additional apparatus remain locked unless the authorised user of either apparatus N, or the at least one additional apparatus submits a request for unlocking via a requesting means.

49. The system of claim 27, being configured to create a network of arbitrary interconnections to distribute power with reconfigurable access control.

50. The system of claim 49, being configured to direct power from one or more devices associated with one or more respective apparatus N to one or more other devices also connected in the network.

51. The system of claim 49, wherein the network further comprises a network enabled service layer to realise a plurality of derivative services including one or more of charging policies, third-party ownership of power, ad-hoc vehicle-to-vehicle, vehicle-to-grid and/or grid-to-vehicle services, infrastructure access and advanced queuing policies.

* * * * *